(12) United States Patent
Lee et al.

(10) Patent No.: US 11,331,980 B2
(45) Date of Patent: May 17, 2022

(54) VEHICLE AIR CONDITIONER

(71) Applicant: Hanon Systems, Daejeon (KR)

(72) Inventors: Se Min Lee, Daejeon (KR); Tae Yong Park, Daejeon (KR); Dae Bok Keon, Daejeon (KR); Yun Jin Kim, Daejeon (KR); Jae Chun You, Daejeon (KR); Yo Chan Min, Daejeon (KR); Sung Je Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 79 days.

(21) Appl. No.: 16/754,104

(22) PCT Filed: Dec. 7, 2018

(86) PCT No.: PCT/KR2018/015502
§ 371 (c)(1),
(2) Date: Apr. 6, 2020

(87) PCT Pub. No.: WO2019/117546
PCT Pub. Date: Jun. 20, 2019

(65) Prior Publication Data
US 2020/0298664 A1 Sep. 24, 2020

(30) Foreign Application Priority Data
Dec. 15, 2017 (KR) .................. 10-2017-0172948

(51) Int. Cl.
*B60H 1/00* (2006.01)
*B60H 1/22* (2006.01)
*B60H 1/32* (2006.01)

(52) U.S. Cl.
CPC ..... *B60H 1/00899* (2013.01); *B60H 1/00021* (2013.01); *B60H 1/22* (2013.01);
(Continued)

(58) Field of Classification Search
CPC .. B60H 1/00899; B60H 1/00021; B60H 1/22; B60H 1/3205; B60H 1/00564;
(Continued)

(56) References Cited

U.S. PATENT DOCUMENTS 5,518,449 A * 5/1996 Danieau ............. B60H 1/00057
165/42
5,735,338 A 4/1998 Chevroulet et al.
(Continued)

FOREIGN PATENT DOCUMENTS

DE 69500706 T2 4/1998
DE 102010055439 A1 6/2012
(Continued)

OTHER PUBLICATIONS

International Search Report and Written Opinion dated Mar. 21, 2019 for International Patent Application No. PCT/KR2018/015502 (with English Translation of International Search Report).

*Primary Examiner* — Marc E Norman
(74) *Attorney, Agent, or Firm* — Dickinson Wright PLLC (57) ABSTRACT

Disclosed is a vehicle air conditioner, wherein an integrated air conditioning module using a heat pump system enables, in order to secure interior space, the optimizing of the arrangement thereof and the arrangements among the elements thereof, and the increasing of a coupling force between an air conditioning module and a distribution duct.

12 Claims, 8 Drawing Sheets

(52) U.S. Cl.
CPC ....... *B60H 1/3205* (2013.01); *B60H 1/00564* (2013.01); *B60H 2001/00178* (2013.01); *B60H 2001/00185* (2013.01); *B60H 2001/00228* (2013.01); *B60H 2001/00942* (2013.01); *B60H 2001/00957* (2013.01)

(58) Field of Classification Search
CPC ........... B60H 2001/00178; B60H 2001/00185; B60H 2001/00228; B60H 2001/00942; B60H 2001/00957
See application file for complete search history.

(56) References Cited

U.S. PATENT DOCUMENTS

| | | | |
|---|---|---|---|
| 10,046,616 B2 * | 8/2018 | Shin | B60H 1/00057 |
| 10,611,207 B2 | 4/2020 | Ryu et al. | |
| 2008/0202137 A1 * | 8/2008 | Inoue | B60H 1/00057 |
| | | | 62/186 |
| 2014/0069604 A1 | 3/2014 | Tamakoshi | |
| 2018/0290516 A1 * | 10/2018 | Ryu | B60H 1/143 |
| 2021/0031586 A1 * | 2/2021 | Lee | B60H 1/26 |
| 2021/0197647 A1 * | 7/2021 | Lee | B60H 1/00328 |

FOREIGN PATENT DOCUMENTS

| | | |
|---|---|---|
| JP | 2005067271 A | 3/2005 |
| JP | 2007308009 A | 11/2007 |
| JP | 2015528419 A | 9/2015 |
| JP | 2017013704 A | 1/2017 |
| JP | 2017036039 A | 2/2017 |
| KR | 101200275 B1 | 11/2012 |
| KR | 101364504 B1 | 2/2014 |
| KR | 20160121730 A | 10/2016 |
| KR | 1020160121730 A | 10/2016 |
| KR | 20170086721 A | 7/2017 |
| WO | 2017195454 A1 | 11/2017 |

* cited by examiner

FIG. 1

PRIOR ART

FIG. 2

PRIOR ART

VEHICLE AIR CONDITIONER

CROSS-REFERENCE TO RELATED APPLICATIONS

This application is a U.S. National Stage of International Patent Application Serial No. PCT/KR2018/015502, filed Dec. 7, 2018, which claims the benefit of Korean Patent Application Serial No. 10-2017-0172948, filed Dec. 15, 2017. The entire disclosures of each of the above applications are incorporated herein by reference.

TECHNICAL FIELD

The present invention relates to an air conditioner for a vehicle, and more particularly, to an air conditioner for a vehicle, which includes an evaporator and a condenser respectively mounted in a first air passageway and a second air passageway inside an air-conditioning case in order to perform cooling and heating in an integrated type.

BACKGROUND ART

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

Such an air conditioner includes: a compressor for compressing and discharging refrigerant; a condenser for condensing the refrigerant of high pressure discharged from the compressor; an expansion valve for throttling the refrigerant condensed and liquefied in the condenser; and an evaporator for exchanging heat between the liquefied refrigerant of low pressure throttled by the expansion valve and air blown to the interior of the vehicle and evaporating the refrigerant to cool the air discharged to the interior of the vehicle due to heat absorption by evaporative latent heat, and a cooling cycle of the air conditioner is configured such that the compressor, the condenser, the expansion valve and the evaporator are connected with each other via refrigeration pipes.

Recently, heat pump systems which perform heating and cooling only using the cooling cycle have been developed. Especially, most of eco-friendly electric vehicles, such as electric vehicles and fuel cell vehicles, adopt a heat pump system capable of heating and cooling the interior of the vehicle without engine coolant since not using engine coolant as a heating heat source.

Figure 1:
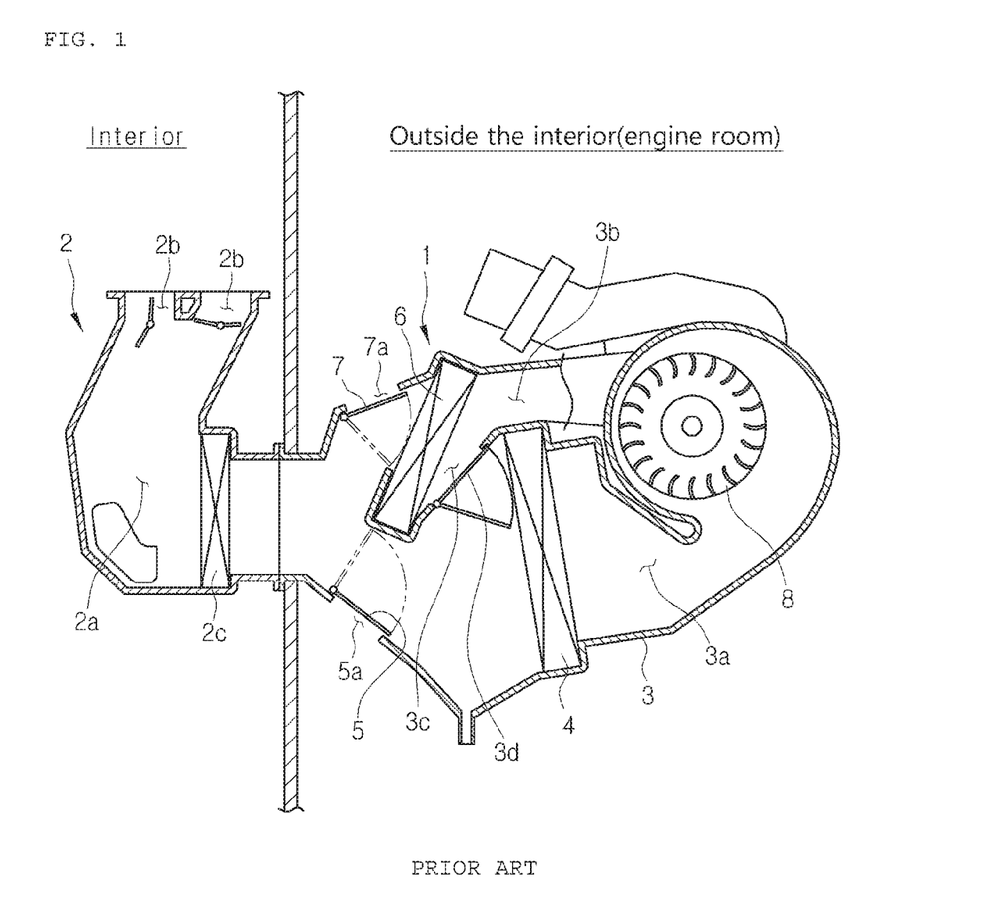
FIG. 1 is a sectional view showing a conventional air conditioner for a vehicle.
Figure 2:
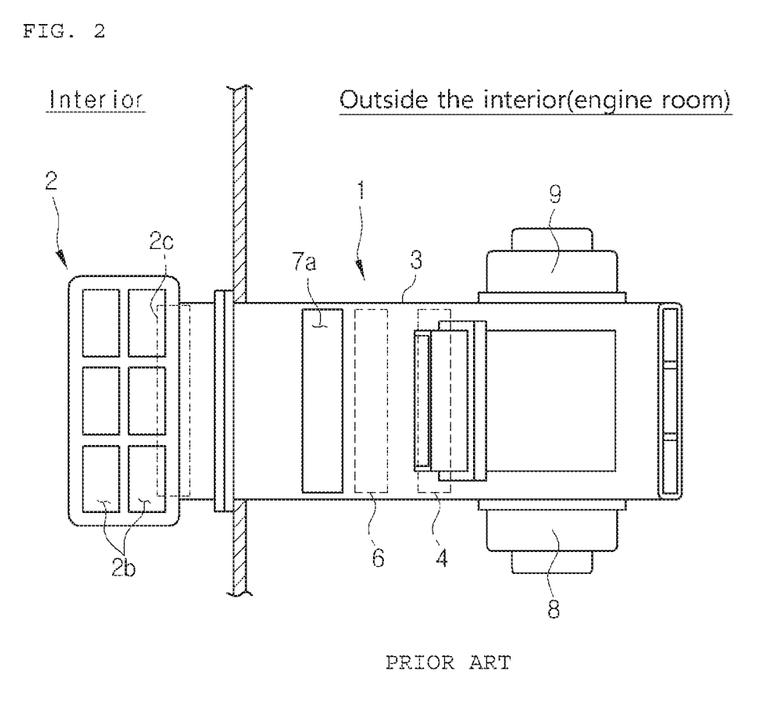
FIG. 2 is a plan view showing the conventional air conditioner for a vehicle.

FIG. 1 is a sectional view showing a conventional air conditioner for a vehicle, and FIG. 2 is a plan view showing the conventional air conditioner for a vehicle. As shown in FIGS. 1 and 2, the air conditioner for a vehicle of a heat pump system includes an air-conditioning module 1 for generating cold air and warm air; and a distribution duct 2 for distributing the cold air and the warm air generated from the air-conditioning module 1 to the interior of the vehicle.

The air-conditioning module 1 includes an air-conditioning case 3 of which the inside is divided into a cold air passageway 3a of a lower side and a warm air passageway 3b of an upper side. A cooling heat exchanger 4 and a cold air adjusting door 5 are disposed in the cold air passageway 3a, and a heating heat exchanger 6 and a warm air adjusting door 7 are disposed in the warm air passageway 3b.

The distribution duct 2 includes an interior passageway 2a communicating with the cold and warm air passageways 3a and 3b of the air-conditioning module 1, and a plurality of discharge vents 2b branching from the internal passageway 2a. The distribution duct 2 discharges the cold air and the warm air blown from the cold and warm air passageways 3a and 3b of the air-conditioning module 1 to various parts of the interior of the vehicle in order to cool and heat the interior of the vehicle. An electric heater 2c acting as an auxiliary heat source in a heating mode may be disposed inside the distribution duct 2.

The air-conditioning module 1 is arranged at an engine room, which is located outside the interior on the basis of a dash panel 10, and the distribution duct 2 is arranged inside the vehicle. Moreover, an indoor air inflow duct for guiding indoor air to the inside of the air-conditioning module 1 is mounted inside the vehicle.

In a cooling mode, the indoor air and the outdoor air blown from a first blower 8 to the cold air passageway 3a are sent to the cooling heat exchanger 4 to be cooled, and the cooled air is blown toward the distribution duct 2 by adjustment of the cold air adjusting door 5. In this instance, the warm air of the warm air passageway 3b heated by the heating heat exchanger 6 is discharged to the outside through a warm air discharge hole 7a by control of the warm air adjusting door 7.

In the heating mode, the indoor air and the outdoor air blown from the second blower 9 to the warm air passageway 3b is heated by the heating heat exchanger 6, and the heated air is blown toward the distribution duct 2 by adjustment of the warm air adjusting door 7. In this instance, the cold air of the cold air passageway 3a cooled by the cooling heat exchanger 4 is discharged to the outside through a cold air discharge hole 5a by control of the cold air adjusting door 5.

Furthermore, in the heating mode, if it is necessary to dehumidify the interior of the vehicle, the cold air of the cold air passageway 3a bypasses toward the warm air passageway 3b through a bypass passageway 3c and a bypass door 3d, in order to supply cold air to the interior of the vehicle to dehumidify the interior of the vehicle.

The conventional air conditioner for a vehicle has a disadvantage in that a space for passenger gets narrower since the distribution duct and the indoor air inflow duct are arranged inside the vehicle.

Additionally, the conventional air conditioner for a vehicle has additional disadvantage in that its structure is complicated and it has limitation in a layout of a design since an intake duct for introducing indoor air and outdoor air, and a vent duct and a floor duct for discharging air-conditioned air to parts of the interior of the vehicle are formed in different directions from one another.

In addition, the integrated type air-conditioning module using the conventional heat pump system increases expenses due to an increase in the number of filters, increases the number of processes for assembly and disassembly, and it is difficult to maintain the air-conditioning module since an indoor air duct and an outdoor air duct are inevitably separated from each other and air filters are respectively mounted in the indoor air duct and the outdoor air duct.

DISCLOSURE

Technical Problem

Accordingly, the present invention has been made in view of the above-mentioned problems occurring in the prior art, and it is an object of the present invention to provide an air conditioner for a vehicle, wherein an integrated air conditioning module using a heat pump system optimizes arrangement thereof and arrangement of components thereof in order to secure an interior space and increase a combining force between an air-conditioning module and a distribution duct.

Technical Solution

To accomplish the above object, according to the present invention, there is provided an air conditioner for a vehicle including: an air-conditioning module having at least one among a heating heat exchanger and a cooling heat exchanger, which exchange heat with air; an intake module for introducing at least one among indoor air and outdoor air to the air-conditioning module; and a distributor module for discharging the air blown from the air-conditioning module to parts of the interior of the vehicle, wherein the air-conditioning module, the intake module and the distributor module are all arranged outside on the basis of a dash panel of the vehicle.

In another aspect of the present invention, there is provided an air conditioner for a vehicle including: an air-conditioning module having a first air passageway and a second air passageway and including a heating heat exchanger disposed in one among the first air passageway and the second air passageway and a cooling heat exchanger disposed in the other one among the first air passageway and the second air passageway; an intake module for introducing at least one among indoor air and outdoor air to the air-conditioning module; and a distributor module for discharging the air blown from at least one among the first air passageway and the second air passageway of the air-conditioning module to parts of the interior of the vehicle, wherein the intake module and the distributor module are formed integrally.

Advantageous Effects

As described above, the air conditioner for a vehicle according to the present invention can secure an interior space of the vehicle to increase a space for passengers. Moreover, the air conditioner for a vehicle according to the present invention can reduce the number of the components since the intake module and the distributor module are formed integrally and make a combining structure simple due to two combining structures between the air-conditioning module and the mixing-duct module so as to increase a combining force.

MODE FOR INVENTION

Hereinafter, a technical structure of an air conditioner for a vehicle according to an embodiment of the present invention will be described in detail with reference to the accompanying drawings.

Figure 3:
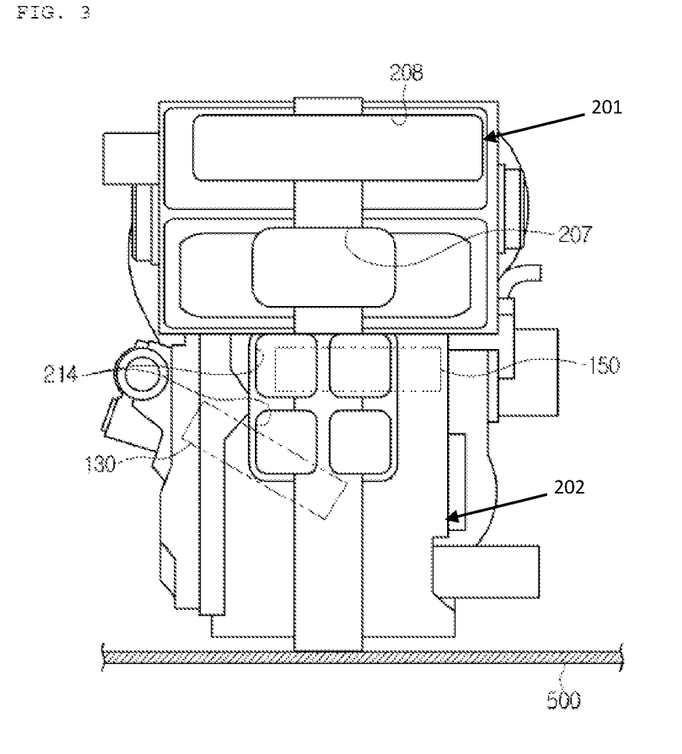
FIG. 3 is a plan view showing an air conditioner for a vehicle according to a preferred embodiment of the present invention.
Figure 4:
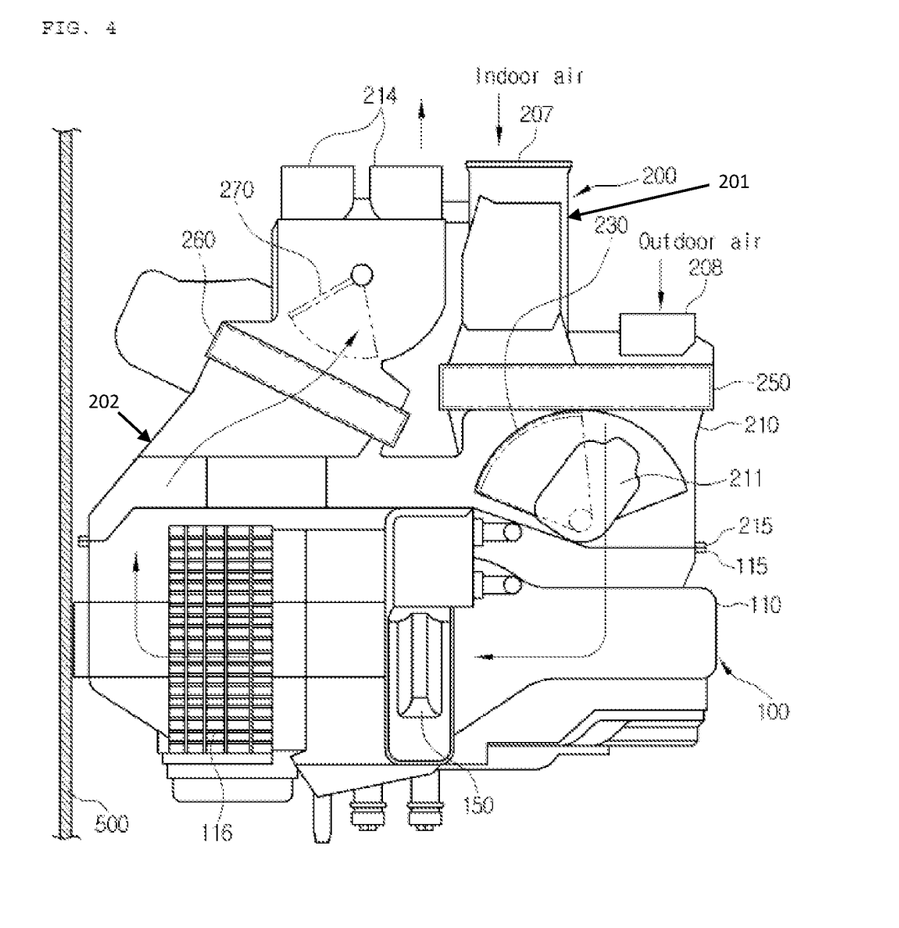
FIG. 4 is a side view showing the air conditioner for a vehicle according to the preferred embodiment of the present invention.
Figure 5:
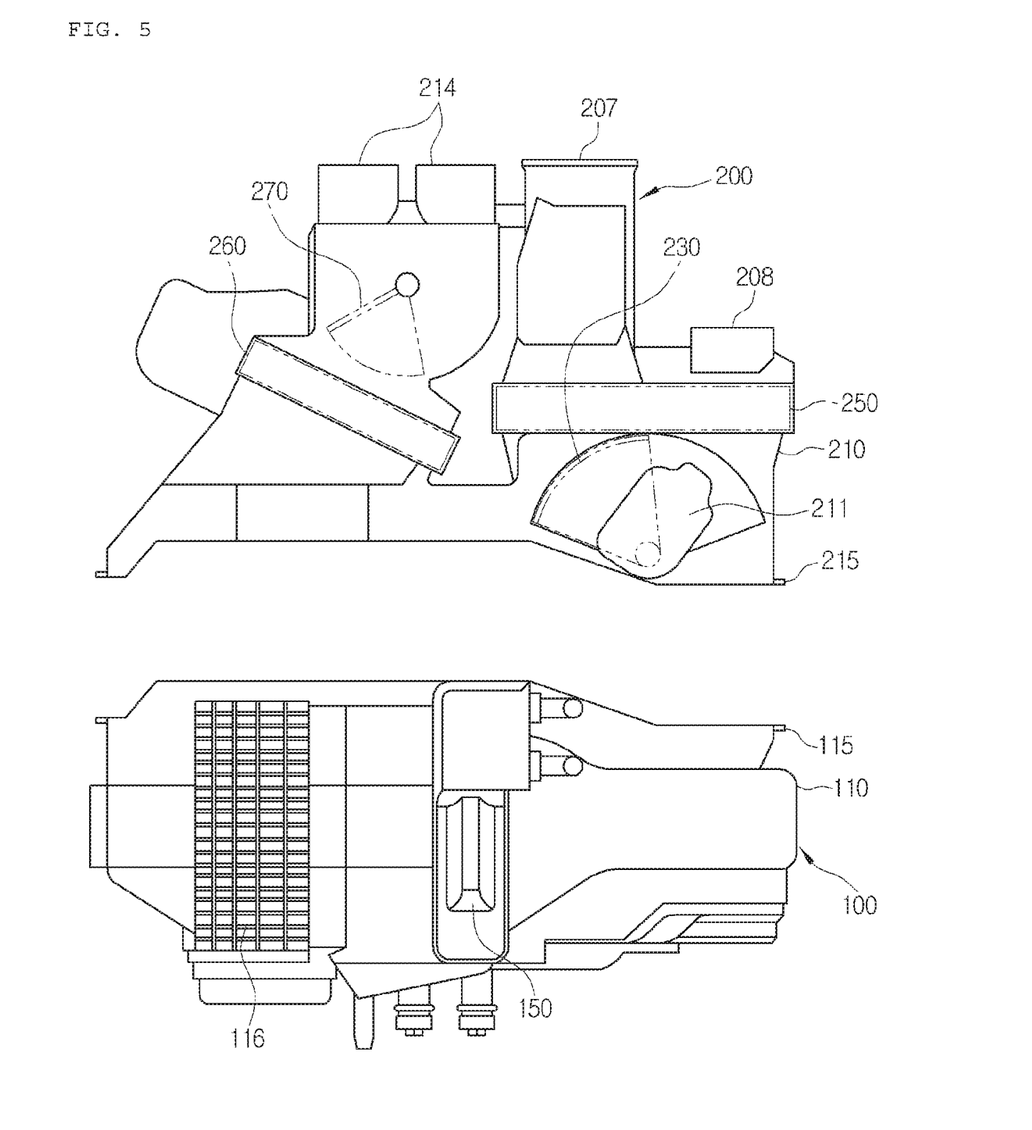
FIG. 5 is a view showing a state where an air-conditioning module and a mixing-duct module of FIG. 4 are separated from each other.
Figure 6:
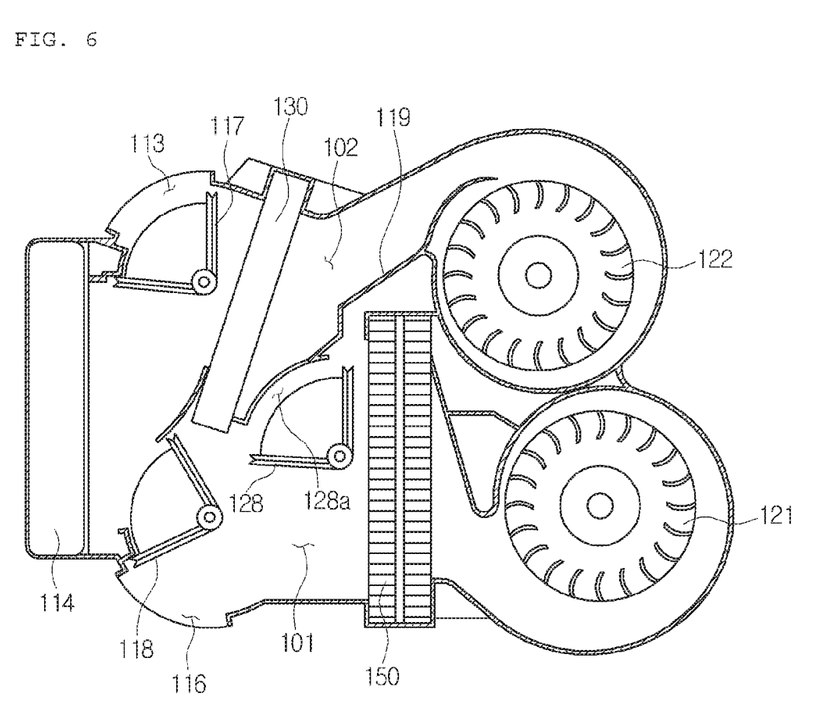
FIG. 6 is a plan sectional view showing the air conditioner for a vehicle according to the preferred embodiment of the present invention.

FIG. 3 is a plan view showing an air conditioner for a vehicle according to a preferred embodiment of the present invention, FIG. 4 is a side view showing the air conditioner for a vehicle according to the preferred embodiment of the present invention, FIG. 5 is a view showing a state where an air-conditioning module and a mixing-duct module of FIG. 4 are separated from each other, and FIG. 6 is a plan sectional view showing the air conditioner for a vehicle according to the preferred embodiment of the present invention.

As shown in FIGS. 3 to 6, the air conditioner for a vehicle according to the preferred embodiment of the present invention has a heat pump system with an integrated air-conditioning type, and includes an air-conditioning module 100 and a mixing-duct module 200.

The air-conditioning module 100 includes at least one among a heating heat exchanger and a cooling heat exchanger, which exchange heat with air. The mixing-duct module 200 includes an intake module 201 and a distributor module 202 which are formed integrally. The intake module 201 introduces at least one of indoor air or outdoor air to the air-conditioning module 100. The distributor module 202 discharges air blown from the air-conditioning module 100 to parts of the interior of the vehicle.

The air-conditioning module 100 includes an air-conditioning case 110, an evaporator 150 which is the cooling heat exchanger, a condenser 130 which is the heating heat exchanger, a compressor, an expansion valve, and a blower unit.

The air-conditioning case 110 includes a first air passageway 101 which is a cooling passageway and a second air passageway 102 which is a heating passageway, and the first air passageway 101 and the second air passageway 102 are partitioned from each other inside the air-conditioning case 110 by a partition wall 119. Indoor air or outdoor air is selectively introduced through the first air passageway 101, and indoor air or outdoor air is selectively introduced also through the second air passageway 102.

The evaporator 150 which is the cooling heat exchanger is disposed in the first air passageway 101. The evaporator 150 exchanges heat between liquid-phase refrigerant of low pressure discharged from the expansion valve, which will be described later, and the inside air of the air-conditioning case 110 so as to cool air due to heat absorption by evaporative latent heat of refrigerant.

The condenser 130 which is the heating heat exchanger is disposed in the second air passageway 102. The condenser 130 exchanges heat between gas-phase refrigerant of high-temperature and high-pressure discharged from the compressor, which will be described later. In this process, the refrigerant is condensed and air is heated.

The compressor is an electro-compressor actuated by electric energy. The compressor inhales and compresses gas-phase refrigerant of low-temperature and low-pressure passing through the evaporator 150, and then, discharges the refrigerant in a gas phase of high-temperature and high-pressure to the condenser 130.

The expansion valve rapidly expands the liquid-phase refrigerant discharged from the condenser 130 by a throttling action, and sends the refrigerant in a wet-saturated state of low-temperature and low-pressure to the evaporator 150. The expansion valve may adopt one of an EXV, a TXV, and an orifice structure. The compressor, the condenser 130, the expansion valve and the evaporator 150 are disposed in a refrigerant line 150 in order.

The air conditioner for a vehicle is to selectively supply indoor air and outdoor air to the evaporator 150 and the condenser 130. In a cooling mode, the indoor air exchanges heat with the evaporator 150 and is supplied to the interior of the vehicle, and the indoor air exchanges heat with the condenser 130 and is discharged to the outside the interior. In a heating mode, the indoor air exchanges heat with the condenser 130 and is supplied to the interior of the vehicle, and the outdoor air exchanges heat with the evaporator 150 and is discharged to the outside the interior. However, a flow of air by each air-conditioning mode is not limited to this embodiment of the present invention.

The blower unit inhales indoor air or outdoor air into the first air passageway 101 and the second air passageway 102. The blower unit includes a blower motor and a blower wheel combined with the blower motor to be rotated. The blower unit may have an inhalation type structure to inhale air into the air-conditioning case 110.

The mixing-duct module 200 includes an intake module 201 and a distributor module 202 which are formed integrally. The distributor module 202 discharges the air blown from at least one among the first air passageway 101 and the second air passageway 102 of the air-conditioning module 100 to parts of the interior of the vehicle.

The air-conditioning module 100, the intake module 201 and the distributor module 202 are all arranged outside on the basis of a dash panel 500 of the vehicle. Therefore, the air conditioner for a vehicle according to the present invention can increase a space for passengers by securing an interior space of the vehicle. The outside arrangement of the air conditioner for a vehicle may be applied not only to the integrated type air-conditioning module of this embodiment, which is applicable to electric vehicles, hybrid vehicles, autonomous vehicles and others, but also to general internal combustion engine vehicles having an evaporator and a heater core.

Moreover, the air conditioner for a vehicle according to the present invention can reduce the number of components since the intake module 201 and the distributor module 202 are formed integrally, and make a combining structure simple due to two combining structures between the air-conditioning module and the mixing-duct module so as to increase a combining force.

The mixing-duct module includes a mixing-duct case 210. The mixing-duct case 210 has an intake case of the intake unit for inhaling air and a distribution case of the distributor module 202 for mixing heated air-conditioned air and discharging the mixed air to the interior of the vehicle, and the intake case and the distribution case are combined with each other in a horizontal direction.

That is, as shown in FIG. 4, the intake module 201 and the distributor module 202 are partitioned from each other in a back-and-forth direction of the vehicle, and then, are combined with each other integrally to form a single mixing-duct module 200. In this instance, the right side in FIG. 4 is the front side of the vehicle, and the left side is the rear side of the vehicle. The left side (rear side) based on the dash panel 500 is the interior space of the vehicle, and the right side is the outside the interior (engine room).

The air-conditioning case 110 and the mixing-duct case 210 are detachably coupled with each other through a means, such as a screw. The air-conditioning case 210 has a coupling portion 115, and the mixing-duct case 210 has another coupling portion 215 corresponding to the coupling portion 115, and the two coupling portions are coupled with each other through the screw. Preferably, the mixing-duct case 210 and the air-conditioning case 110 are coupled with each other in a vertical direction. More preferably, the mixing-duct case 210 is arranged on the air-conditioning case 110.

As described above, the air conditioner for a vehicle according to the present invention can reduce the number of components and increase a combining force through the coupling structure of the two components between the air-conditioning module 100 and the mixing-duct module 200. Furthermore, through the vertical combining structure between the air-conditioning module 100 and the mixing-duct module 200, the air conditioner for a vehicle according to the present invention can enhance the combining force due to a fixing structure by self-load and is structurally advantageous to bending deflection when being installed in a vehicle.

The mixing-duct case 210 includes an indoor air inlet 207, an outdoor air inlet 208, and a plurality of air outflow holes 214. The indoor air inlet 207 is to introduce indoor air into the air-conditioning case, and is connected to an indoor air inflow duct to inhale indoor air. The outdoor air inlet 208 is to introduce outdoor air into the air-conditioning case, and is connected to an outdoor air inflow duct to inhale outdoor air.

The indoor air inlet 207, the outdoor air inlet 208, and the air outflow holes 214 are all formed in the same direction. That is, the indoor air inlet 207, the outdoor air inlet 208, and the air outflow holes 214 are all opened upwardly. The air outflow hole 214 includes a roof vent for discharging air-conditioned air toward the ceiling, in the interior of the vehicle, and a floor vent for discharging the air-conditioned air toward the floor, in the interior of the vehicle. The mixing-duct module 200 may further include a PTC heater 260, which is an auxiliary heating heat source, at the distributor module 202. Moreover, a mode door 270 for selectively discharging air to the roof vent or the floor vent may be disposed at the front ends of the air outflow holes 214.

The mixing-duct module 200 includes a single air filter 250. The air filter 250 filters air introduced into the indoor air inlet 207 and the outdoor air inlet 208. Therefore, the air conditioner for a vehicle according to the present invention can overcome the disadvantages of the conventional integrated type air-conditioning module that the outdoor air inflow duct and the indoor air inflow duct are formed separately and an outdoor air filter and an indoor air filter are respectively disposed at the outdoor air inflow duct and the indoor air inflow duct. Namely, the air conditioner for a vehicle according to the present invention can effectively filter foreign matters in the indoor air and the outdoor air using the single air filter, thereby reducing the number of the components, reducing manufacturing costs, and making maintenance easy. Such effects can be achieved through optimization in the combining structure and arrangement between the air-conditioning module and the mixing-duct module, and arrangement of the indoor air inlet and the outdoor air inlet.

The air-conditioning module 100 includes a first blower unit 121 and a second blower unit 122 respectively disposed in the first air passageway 101 and the second air passageway 102. The first blower unit 121 and the second blower unit 122 are arranged parallel in a horizontal direction. Additionally, the indoor air inlet 207 and the outdoor air inlet 208 of the mixing-duct case 210 are located above the second blower unit 122 to correspond to each other.

More preferably, the indoor air inlet 207 and the outdoor air inlet 208 are arranged side by side in the back-and-forth direction of the vehicle, and the first blower unit 121 and the second blower unit 122 are arranged side by side in a width direction (lateral direction) of the vehicle. The indoor air introduced into the indoor air inlet 207 selectively flows to one among the first blower unit 121 and the second blower unit 122, and the outdoor air introduced into the outdoor air inlet 208 selectively flows to the other one among the first blower unit 121 and the second blower unit 122. That is, the indoor air or the outdoor air partitioned and introduced in the back-and-forth direction of the vehicle is guided in the width direction (lateral direction) of the vehicle according to an internal passageway structure and flows to the first blower unit 121 or the second blower unit 122. Through the above structure, the air conditioner can be designed intensively in the back-and-forth direction and in the width direction of the vehicle, so that the package of the air conditioner can be reduced.

The single air filter 250 is arranged below the indoor air inlet 207 and the outdoor air inlet 208, and an indoor and outdoor air converting door 230 is disposed between the air filter 250 and the blower unit. The indoor and outdoor air converting door 230 is rotatably mounted on the mixing-duct case 210 and controls the degree of opening of the indoor air inlet 207 and the outdoor air inlet 208 so as to selectively introduce indoor air and outdoor air toward the air-conditioning module 100.

The indoor and outdoor air converting door 230 is rotated by an actuator. The mixing-duct case 210 may include an actuator cover 211 formed integrally with the mixing-duct case to cover the actuator. More preferably, the mixing-duct case 210 can cover electronic parts, such as the actuator, the evaporator and the condenser, from the top in order to protect the components from external foreign matters and secure stability against water permeation from the outside.

The air conditioner for a vehicle has a generally "⌙" or "U" shaped passage through the structure of the plurality of air outflow holes 214 located above the air-conditioning module 100 in where the air-conditioning module 100 and the mixing-duct module 200 are combined with each other vertically, and the indoor air inlet 207 and the outdoor air inlet 208 are arranged at the upper part, a pair of the blower units 121 and 122 are arranged collaterally below the indoor air inlet 207 and the outdoor air inlet 208, and the evaporator 150 and the condenser 130 are arranged in the horizontal direction relative to the blower units 121 and 122.

That is, the air moves downwardly through the indoor air inlet 207 or the outdoor air inlet 208 of the mixing-duct module 200, exchanges heat with at least one of the heating heat exchanger and the cooling heat exchanger while moving in the horizontal direction from the air-conditioning module 100, and then, moves upwardly through the air outflow holes 214 of the mixing-duct module 200 so as to form an air flow of the "⌙" or "U" shape.

Through the above-mentioned structure, the air-conditioning module and the mixing-duct module can have a compact size, so that the air conditioner can reduce the entire volume and weight and minimize resistance in the limited space due to the minimum curved section of the air so as to effectively prevent reduction of air volume.

The air-conditioning module 100 includes a cold air discharge hole 116 formed at the downstream side of the evaporator 150 in the first air passageway 101, and a warm air discharge hole 113 formed at the downstream side of the condenser 130 in the second air passageway 102. The cold air discharge hole 116 is formed at the left side of the air-conditioning case 110, and the warm air discharge hole 113 is formed at the right side of the air-conditioning case 110. Moreover, the air-conditioning case 110 includes a communication passageway 114 formed at the downstream side of the evaporator 150 of the first air passageway 101 and at the downstream side of the condenser 130 of the second air passageway 102 to communicate with the mixing-duct module 200.

A cold air mode door 118 is rotatably disposed at the downstream side of the evaporator 150 of the first air passageway 101, and a warm air mode door 117 is rotatably disposed at the downstream side of the condenser 130 of the second air passageway 102. The cold air mode door 118 adjusts an amount of air directing the communication passageway 114 and an amount of air directing the cold air discharge hole 116, and the warm air mode door 117 adjusts an amount of air directing the communication passageway 114 and an amount of air directing the warm air discharge hole 113.

Furthermore, the air-conditioning module 100 includes a bypass door 128 and a bypass passageway 128a. In the heating mode, if it is necessary to dehumidify the interior of the vehicle, the cold air of the first air passageway 101 bypasses toward the second air passageway 102 through the bypass door 128 and the bypass passageway 128a. Therefore, the cold air toward the first air passageway 101 is supplied to the interior of the vehicle to dehumidify the interior of the vehicle.

Figure 7:
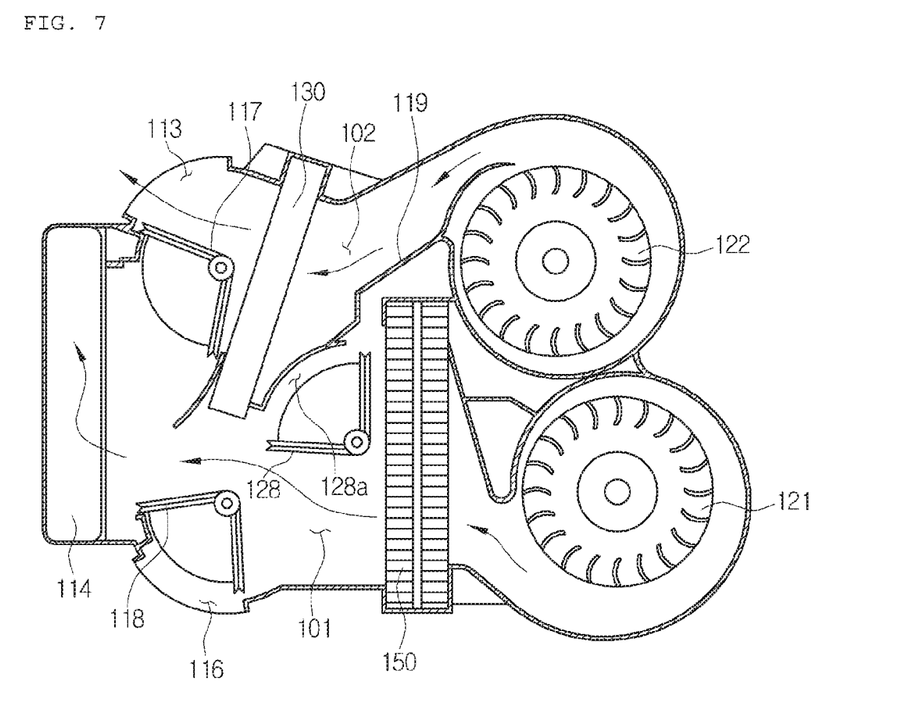
FIG. 7 is a view showing a cooling mode of the air conditioner for a vehicle according to the preferred embodiment of the present invention.

FIG. 7 is a view showing a cooling mode of the air conditioner for a vehicle according to the preferred embodiment of the present invention.

Referring to FIG. 7, in the cooling mode, the indoor air is introduced into the first air passageway 101, exchanges heat with the evaporator 150, and then, is cooled. The cold air mode door 118 is rotated to close the cold air discharge hole 116 and open the air passageway toward the communication passageway 114. The cooled air passes through the communication passageway 114, and is circulated to the interior of the vehicle through the air outflow holes 214 of the mixing-duct module 200.

At the same time, the outdoor air is introduced into the second air passageway 102, exchanges heat with the condenser 130, and then, is heated. The warm air mode door 117 is rotated to close the communication passageway 114 and open the warm air discharge hole 113. The heated air is discharged to the outside through the warm air discharge hole 113.

Figure 8:
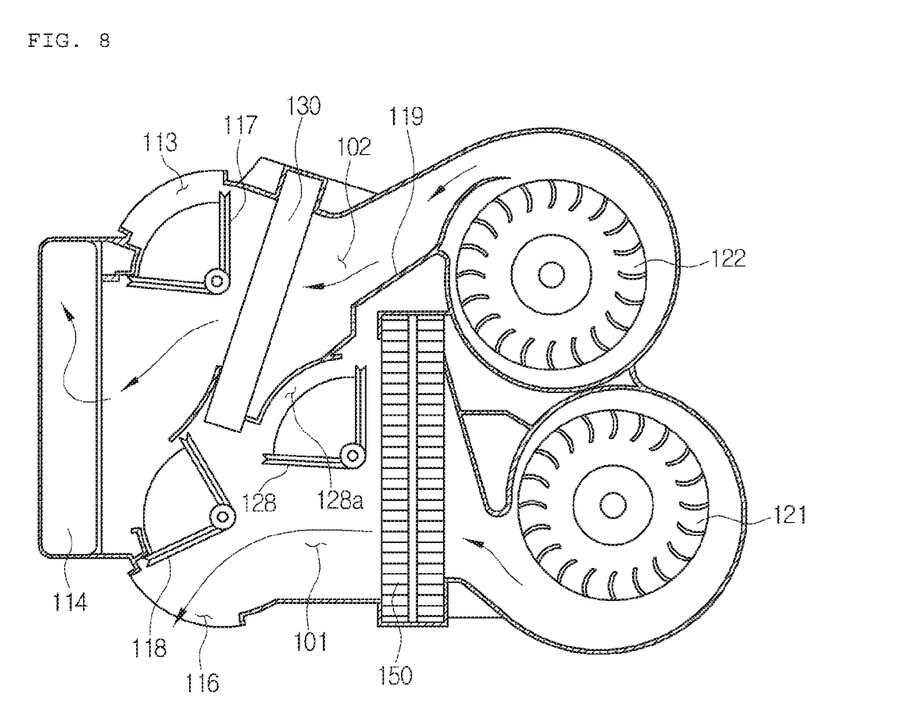
FIG. 8 is a view showing a heating mode of the air conditioner for a vehicle according to the preferred embodiment of the present invention.

FIG. 8 is a view showing a heating mode of the air conditioner for a vehicle according to the preferred embodiment of the present invention.

Referring to FIG. 8, in the heating mode, the indoor air is introduced into the second air passageway 102, exchanges heat with the condenser 130, and then, is heated. The warm air mode door 117 is rotated to close the warm air discharge hole 113 and open the communication passageway 114. The heated air passes through the communication passageway 114, and is circulated into the interior of the vehicle through the air discharge holes 214 of the mixing-duct module 200.

At the same time, the outdoor air is introduced into the first air passageway 101, exchanges heat with the evaporator 150, and then, is cooled. The cold air mode door 118 is rotated to close the communication passageway 114 and open the cold air discharge hole 116. The cooled air is discharged to the outside the interior through the cold air discharge hole 116.

The invention claimed is:

1. An air conditioner for a vehicle comprising:
an air-conditioning module having a first air passageway and a second air passageway and including a heating heat exchanger disposed in one among the first air passageway and the second air passageway, and a cooling heat exchanger disposed in the other one among the first air passageway and the second air passageway;
an intake for introducing at least one among indoor air and outdoor air to the air-conditioning module; and
a distributor module for discharging the air blown from at least one among the first air passageway and the second air passageway of the air-conditioning module to parts of the interior of the vehicle,
wherein the intake and the distributor module are formed integrally;
wherein the intake and the distributor module form a mixing-duct module formed integrally, and the mixing-duct module has a mixing-duct case;
wherein the air-conditioning module includes an air-conditioning case, and
wherein the air-conditioning case and the mixing-duct case are combined with each other.

2. The air conditioner according to claim 1, wherein the air-conditioning case and the mixing-duct case are combined with each other vertically.

3. The air conditioner according to claim 2, wherein the mixing-duct case is arranged on the air-conditioning case.

4. The air conditioner according to claim 1, wherein the mixing-duct case includes an indoor air inlet, an outdoor air inlet, and at least one air outflow hole, and
wherein the indoor air inlet, the outdoor air inlet, and the air outflow hole are all formed in the same direction as one another.

5. The air conditioner according to claim 4, wherein the indoor air inlet, the outdoor air inlet, and the air outflow hole are opened upwardly.

6. The air conditioner according to claim 4, wherein the air outflow hole includes a roof vent for discharging air-conditioned air toward the ceiling, in the interior of the vehicle, and a floor vent for discharging the air-conditioned air toward the floor, in the interior of the vehicle.

7. The air conditioner according to claim 1, wherein the mixing-duct module includes a single air filter for filtering the air introduced into the indoor air inlet and the outdoor air inlet.

8. The air conditioner according to claim 1, wherein the air-conditioning module includes a first blower unit and a second blower unit respectively disposed in the first air passageway and the second air passageway, and the first blower unit and the second blower unit are arranged parallel in a horizontal direction.

9. The air conditioner according to claim 8, wherein the indoor air inlet and the outdoor air inlet of the mixing-duct case are located above the first blower unit and the second blower unit.

10. The air conditioner according to claim 8, wherein the indoor air inlet and the outdoor air inlet are arranged side by side in a back-and-forth direction of the vehicle, and the first blower unit and the second blower unit are arranged side by side in a width direction (in a lateral direction) of the vehicle.

11. The air conditioner according to claim 1, wherein the mixing-duct case includes an actuator cover formed integrally to cover an actuator which operates a door.

12. The air conditioner according to claim 1, wherein the air moves downwardly through the indoor air inlet or the outdoor air inlet of the mixing-duct module, exchanges heat with at least one of the heating heat exchanger and the cooling heat exchanger while moving in the horizontal direction from the air-conditioning module, and then, moves upwardly through the air outflow holes of the mixing-duct module so as to form an air flow of a "⊔" or "U" shape.

* * * * *